July 7, 1925.
S. A. SMITH
ANIMAL TRAP
Filed March 1, 1924
1,545,018
2 Sheets-Sheet 1
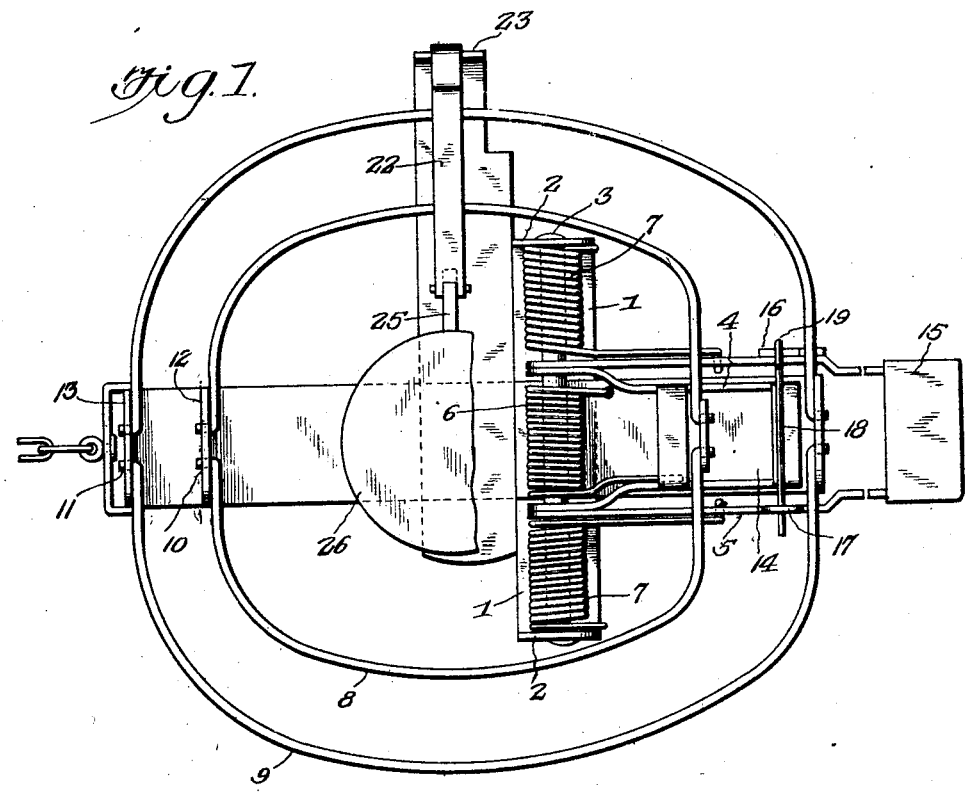
Fig. 1.
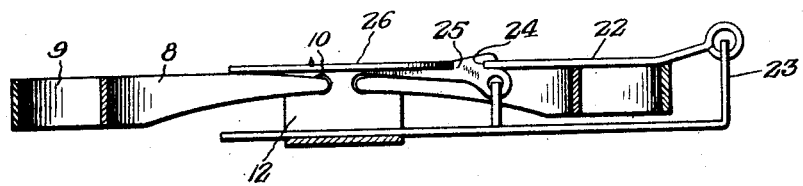
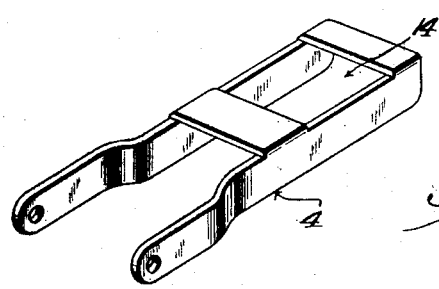
Fig. 4.
Fig. 5.
Inventor
Sarah A. Smith,
By Geo. C. Shoemaker
Attorney July 7, 1925.

S. A. SMITH

ANIMAL TRAP

Filed March 1, 1924

Inventor
Sarah A. Smith,
By Geo. C. Shoemaker
Attorney

Patented July 7, 1925.

1,545,018

UNITED STATES PATENT OFFICE.

SARAH ALICE SMITH, OF NEW ORLEANS, LOUISIANA.

ANIMAL TRAP.

Application filed March 1, 1924. Serial No. 696,264.

*To all whom it may concern:*

Be it known that I, SARAH ALICE SMITH, a citizen of the United States, residing at New Orleans, in the parish of Orleans and State of Louisiana, have invented new and useful Improvements in Animal Traps, of which the following is a specification.

The invention relates to improvements in duplex or two-in-one animal traps. The object of the present invention is to improve the construction of animal traps and to provide a simple, practical and efficient animal trap of strong, durable and comparatively inexpensive construction equipped with inner and outer jaws, adapted to engage the foot and leg of an animal and capable of simultaneous and independent operation so that both of the jaws may be operated when the trap is in normal condition and either of the jaws may be operated should the actuating of the spring of the other become broken.

It is also an object of the invention to provide a double jaw trap of this character equipped with means for enabling both pairs of jaws to be simultaneously set and maintained in such set condition by a single trigger mechanism.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:

Figure 1 is a plan view of a trap constructed in accordance with this invention and shown set.

Figure 4 is a similar view of the inner swinging arm.

Figure 5 is a detailed sectional view of the setting and trapping mechanism.

Figure 2:
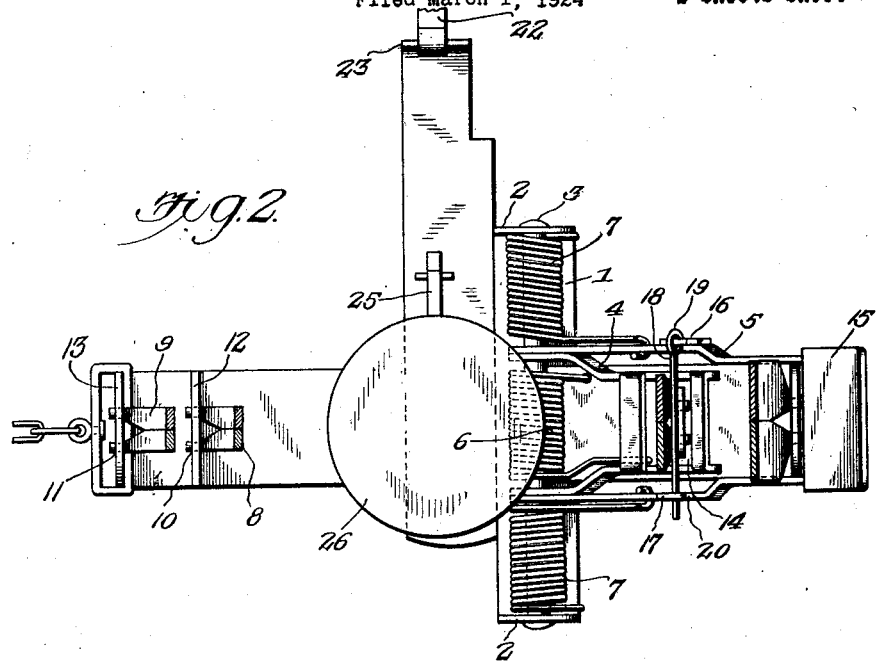
Figure 2 is a similar view partly in section illustrating the arrangement of the parts preparatory to simultaneously setting of the inner and outer pairs of jaws.
Figure 3:
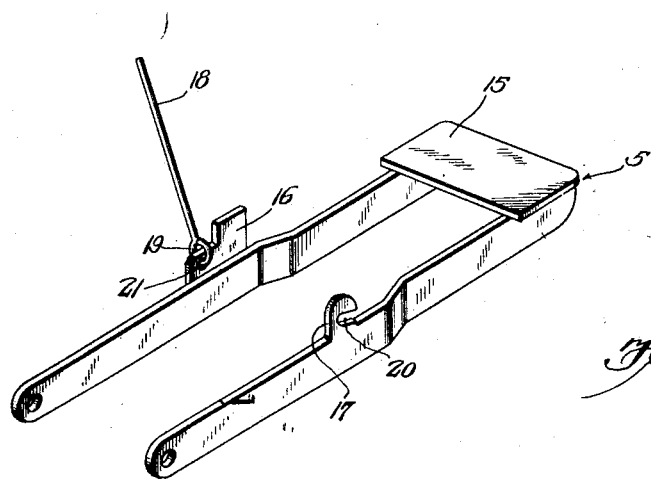
Figure 3 is a detailed perspective view of the outer swinging arm.

In the accompanying drawing in which is illustrated the preferred embodiment of the invention, the animal trap which may be made of any desired size comprises in its construction a base 1, provided with spaced upwardly projecting lugs 2 having openings to receive a horizontal pivot rod 3, on which is mounted inner and outer swingings arms 4 and 5 and springs 6 and 7, for actuating the swinging arms 4 and 5 to close inner and outer pairs of jaws 8 and 9. The jaws are hinged or pivoted at their ends at 10 and 11 in lugs 12 and 13 of the base, their pivots being preferably formed by terminals of the jaws and arranged at right angles to the pivot rod 3. The inner jaws are of less size than the outer jaws and are designed for engaging the foot of an animal and they extend through an opening 14 of the inner swinging arm 4 and are adapted to be engaged by the said arm. The swinging arm 4 is composed of spaced sides and connecting cross pieces as shown and it may be readily stamped from a single piece of metal. The inner swinging arm may however, be constructed in any other desired manner, as will be readily understood and the spring 6, which is centrally arranged on the rod 3, has one of its terminals engaged with the inner swinging arm preferably at the inner side of the opening 14.

The outer swinging arm is composed of spaced sides and a connecting outer cross piece 15, preferably in the form of a plate and adapted to be readily depressed by the foot or hand for simultaneously setting both the inner and outer pairs of jaws. The springs 7 which are located at the end portions of the pivot rod 3 have terminals engaged with the sides of the outer arm preferably by being hooked under the same, but they may be connected with the outer arm in any other desired manner. In order to enable the two jaws to be simultaneously set by depressing the outer swinging arm, the latter is provided at opposite sides with lugs 16 and 17 and a movable cross rod 18 provided with an eye 19 at one end for connecting it to the lug 16 and having its other end free and engageable with a notch 20 of the other lug 17.

The eye 19 is linked into an opening 21 of the lug 16 to form a hinge or pivotal connection to permit the cross rod to be swung into and out of the notch 20 which extends inwardly from the outer edge of the lug 17 and which is arranged in an inclined position when the trap is sprung. This will enable the rod to seat in the notch and the pressure of the rod against the inner arm will prevent any accidental slipping of the rod from the notch during the setting operation. The rod 18 when in engagement with the notch 20 extends across the inner arm and is adapted to carry the inner arm downwardly with the outer arm when the latter is depressed for setting the trap.

To set the trap the rod 18 is engaged with the notch 20 and the outer swinging arm is depressed to place the springs under tension and to permit the inner and outer jaws to be engaged with the setting and trapping mechanism which consists of a setting lever 22 hinged to a lug 23 at one end and adapted to have its other end engaged with a notch 24 of a trigger 25, having a treadle plate 26 of the ordinary construction. One of the jaws of each set is engaged beneath the setting lever and is maintained in set position by the setting mechanism. When the trap is set, the side springs 7 exert their pressure only on the heavier outer jaws while the central spring maintains its pressure solely on the inner smaller jaws and the trigger mechanism is subjected to the pressure of the springs of both the inner and outer jaws, and when the treadle plate is depressed by an animal, the inner jaws will catch the foot of the animal and the outer jaws will engage the leg of the animal. Should the spring of the inner jaw become broken, the outer jaws may be set and should the springs of the outer jaws become broken, the inner jaws may be set and it will be apparent that the trigger mechanism will permit simultaneous and independent operation of the jaws in this manner.

What is claimed is:

1. An animal trap comprising a base, inner and outer jaws arranged in pairs, inner and outer spring actuated arms arranged to engage the jaws for closing the same and means for detachably connecting the arms for permitting simultaneous setting of the trap.

2. An animal trap comprising a base, inner and outer jaws arranged in pairs, inner and outer spring actuated arms arranged to engage the jaws for closing the same, means for detachably connecting the arms for permitting simultaneous setting of the trap, said means comprising a locking device carried by one arm and arranged to engage the other.

3. An animal trap comprising a base, inner and outer jaws arranged in pairs, inner and outer spring actuated arms arranged to engage the jaws for closing the same and means for detachably connecting the arms for permitting simultaneous setting of the trap, said means comprising a rod hinged to the outer arm and arranged to extend into the path of and engage the inner arm.

4. An animal trap comprising a base, inner and outer jaws arranged in pairs, inner and outer spring actuated arms arranged to engage the jaws for closing the same and means for detachably connecting the arms for permitting simultaneous setting of the trap, said means comprising a rod hinged at one end to the outer arm at one side thereof and adapted to extend across the inner arm and a lug mounted on the outer arm at the opposite side thereof and arranged to receive and engage the free end of the rod.

5. An animal trap comprising a base, inner and outer pairs of jaws hinged to the base, inner and outer spring actuated swinging arms connected with the inner and outer jaws and arranged to close the same, a setting and trapping mechanism composed of a setting lever arranged to extend across and engage one of the jaws of each pair and a trigger for holding the setting lever, said setting mechanism being adapted to permit an operation of both or either pair of jaws.

6. An animal trap comprising a base, inner and outer jaws arranged in pairs, spring actuated arms arranged one within the other and adapted to close the jaws, and a locking device bridging the arms for permitting simultaneous setting of the trap.

7. An animal trap comprising a base, inner and outer jaws arranged in pairs, spring actuated arms arranged one within the other and adapted to close the jaws, the base having a lug at one end, a lever swingingly connected to said lug and arranged to extend across one jaw of each pair, and a trigger for holding said lever to permit operation of both or either set of jaws.

8. An animal trap comprising a base, inner and outer jaws arranged in pairs, the base being provided with spaced lugs, a rod mounted in said lugs, inner and outer arms swingingly mounted on said rod, springs on said rod engaging said arms to actuate the arms for closing the jaws, and a device detachably connecting the arms for permitting simultaneous setting of the trap.

9. An animal trap comprising a base, inner and outer jaws arranged in pairs, a rod mounted on the base within the area of the inner jaws when the latter are open, spring actuated arms swingingly mounted on said rod and arranged to engage the jaws for closing the same, and means for detachably connecting the arms for permitting simultaneous setting of the trap.

10. An animal trap comprising a base, inner and outer jaws arranged in pairs, a rod mounted on the base within the area of the inner jaws when the latter are open, spring actuated arms swingingly mounted on said rod and arranged to engage the jaws for closing the same, a lever arranged to extend across and engage one of the jaws of each pair, and a device for holding said lever.

In testimony whereof I have hereunto set my hand.

SARAH ALICE SMITH.